Nov. 10, 1964 M. BUD 3,156,518

TIME RECORDING DEVICES

Filed Jan. 16, 1961 12 Sheets-Sheet 1

Inventor:
MARTIN BUD
By Karl F. Ross
AGENT

TIME RECORDING DEVICES

Filed Jan. 16, 1961 12 Sheets-Sheet 2

Inventor:
MARTIN BUD

By Karl F. Ross
AGENT

Nov. 10, 1964 M. BUD 3,156,518

TIME RECORDING DEVICES

Filed Jan. 16, 1961 12 Sheets-Sheet 3

Inventor:
MARTIN BUD

By Karl F. Ross
AGENT

Nov. 10, 1964 | M. BUD | 3,156,518

TIME RECORDING DEVICES

Filed Jan. 16, 1961 | 12 Sheets-Sheet 4

Inventor:
MARTIN BUD

By Karl F. Ross

AGENT

Inventor:
MARTIN BUD
By Karl F. Ross
AGENT

Inventor:
MARTIN BUD
By Karl F. Ross
AGENT

Inventor:
MARTIN BUD
By Karl F. Ross
AGENT

Inventor:
MARTIN BUD
By Karl F. Ross
AGENT

Nov. 10, 1964 M. BUD 3,156,518

TIME RECORDING DEVICES

Filed Jan. 16, 1961 12 Sheets-Sheet 9

Inventor:
MARTIN BUD

By Karl F. Ross

AGENT

Inventor:
MARTIN BUD
By Karl F. Ross
AGENT

Inventor:
MARTIN BUD
By Karl F. Ross
AGENT

Nov. 10, 1964 M. BUD 3,156,518

TIME RECORDING DEVICES

Filed Jan. 16, 1961 12 Sheets-Sheet 12

Inventor:
MARTIN BUD
By Karl F. Ross
AGENT

United States Patent Office 3,156,518

Patented Nov. 10, 1964

3,156,518

TIME RECORDING DEVICES

Martin Bud, 9 Heathgate, London NW. 11, England

Filed Jan. 16, 1961, Ser. No. 82,860

Claims priority, application Great Britain, Feb. 5, 1960, 4,131/60

4 Claims. (Cl. 346—86)

The invention relates to time recording devices for registering times on record cards to indicate the commencing and finishing times of workpeople's attendances, jobs, and the like.

With known such devices a record card is inserted into the device and the time of insertion is imprinted on the card in fields suitably provided thereon, the time being usually indicated in hours and minutes, or in hours and decimal fractions of hours. The imprints on the card have to be evaluated by a clerk. Experience has shown that the evaluation of the imprinted cards is tedious, and that mistakes are likely to occur, for example, by confusing a time of commencing a job with that of finishing the job.

It is an object of the invention to provide a time recording device which records times by punching or otherwise marking a record card for indicating times to be recorded so as to enable the recorded markings to be easily evaluated automatically, whereby the danger of mistakes is avoided or at least reduced.

It is another object to provide a time recording device which comprises movable guide means for positioning a record receiving means such as a record card, a record tape (which for brevity will be called hereinafter "record card") in the device relative to a plurality of marking means, the guide means and the marking means being controllable by a clock mechanism in such a manner that the general position of the marking on the record card in one of two directions is indicative of units of time and the position in the other direction is indicative of sub-units of time.

It is a further object of the invention to provide a time recording device which comprises guide means for positioning an elongated record card in the device relative to a series of punches with the series of punches extending across the width of the card, a clock mechanism being provided for moving the guide means in a step-by-step manner relative to the punches, in the direction of the longitudinal axis of the card by one step per unit of time, a punch-actuating drum having a series of radially arranged punch-actuating projections being provided for engaging a punch of the series by a corresponding one of the punch-actuating projections on movement of the punch-actuating drum towards the punches, whereby to cause the said punch to punch a hole in a card, when positioned in the guide means, the clock mechanism being so linked to the punch-actuating drum that at the expiration of each sub-unit of time the punch-actuating drum is rotated by one step to present a different one of the series of punch-actuating projections to a different one of the series of punches.

The above and other objects and advantages of the invention will become apparent from the following detailed description of two embodiments of the invention when read in conjunction with the appended drawings, which are given by way of example and in which.

Figure 1:
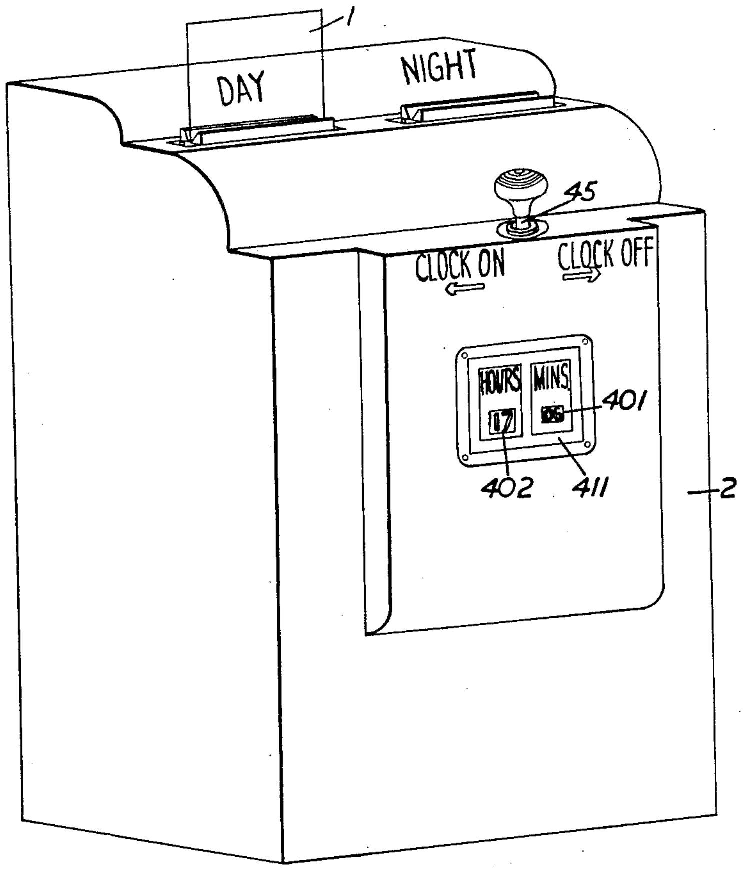
FIG. 1 is a perspective view of a time recording device with a record card inserted therein.

The time recording device, shown in FIG. 1, enables holes to be punched in an elongated record card 1 in a manner such that each hole is representative of the time of punching. The device comprises an outer casing 2 within which a number of assemblies, visible in FIG. 2, are arranged.

Figure 2:
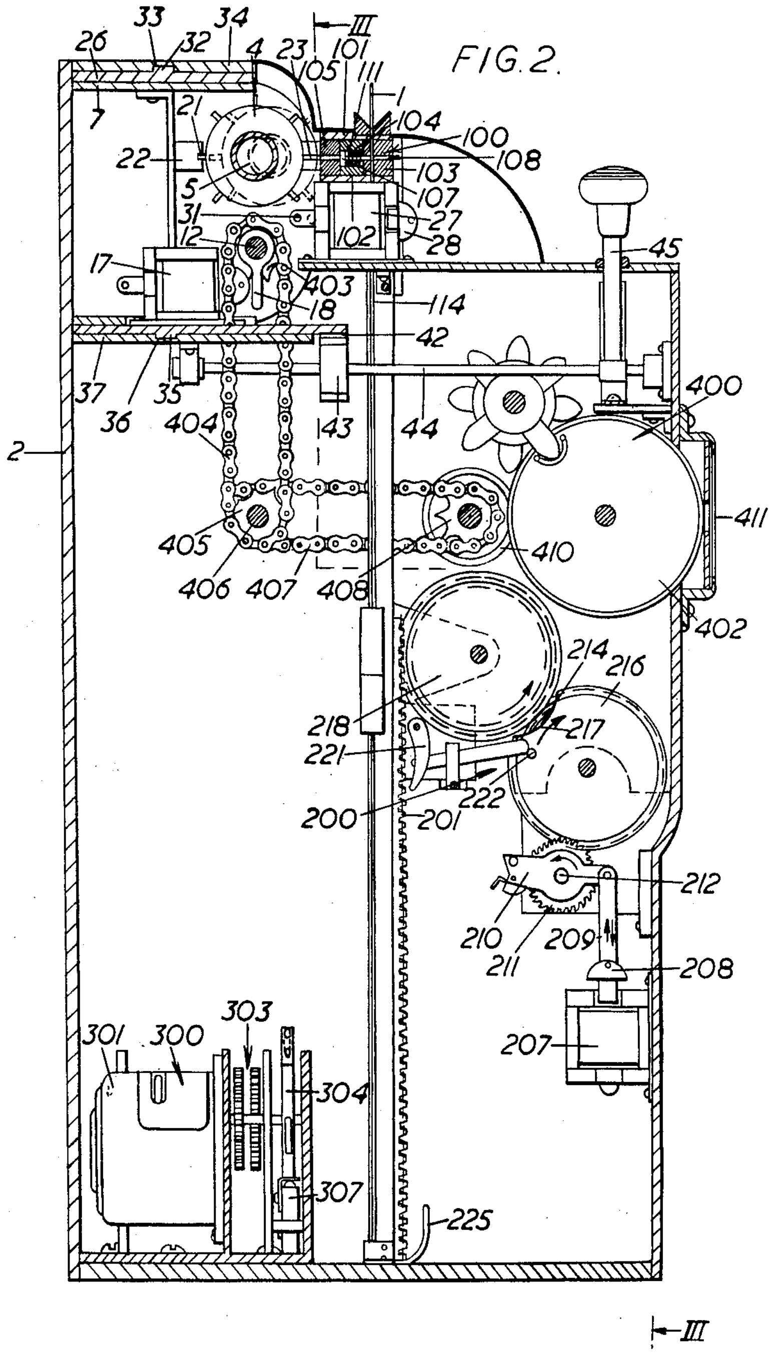
FIG. 2 is a sectional view, partly broken away, through the device along the line II—II of FIG. 3.
Figure 3:
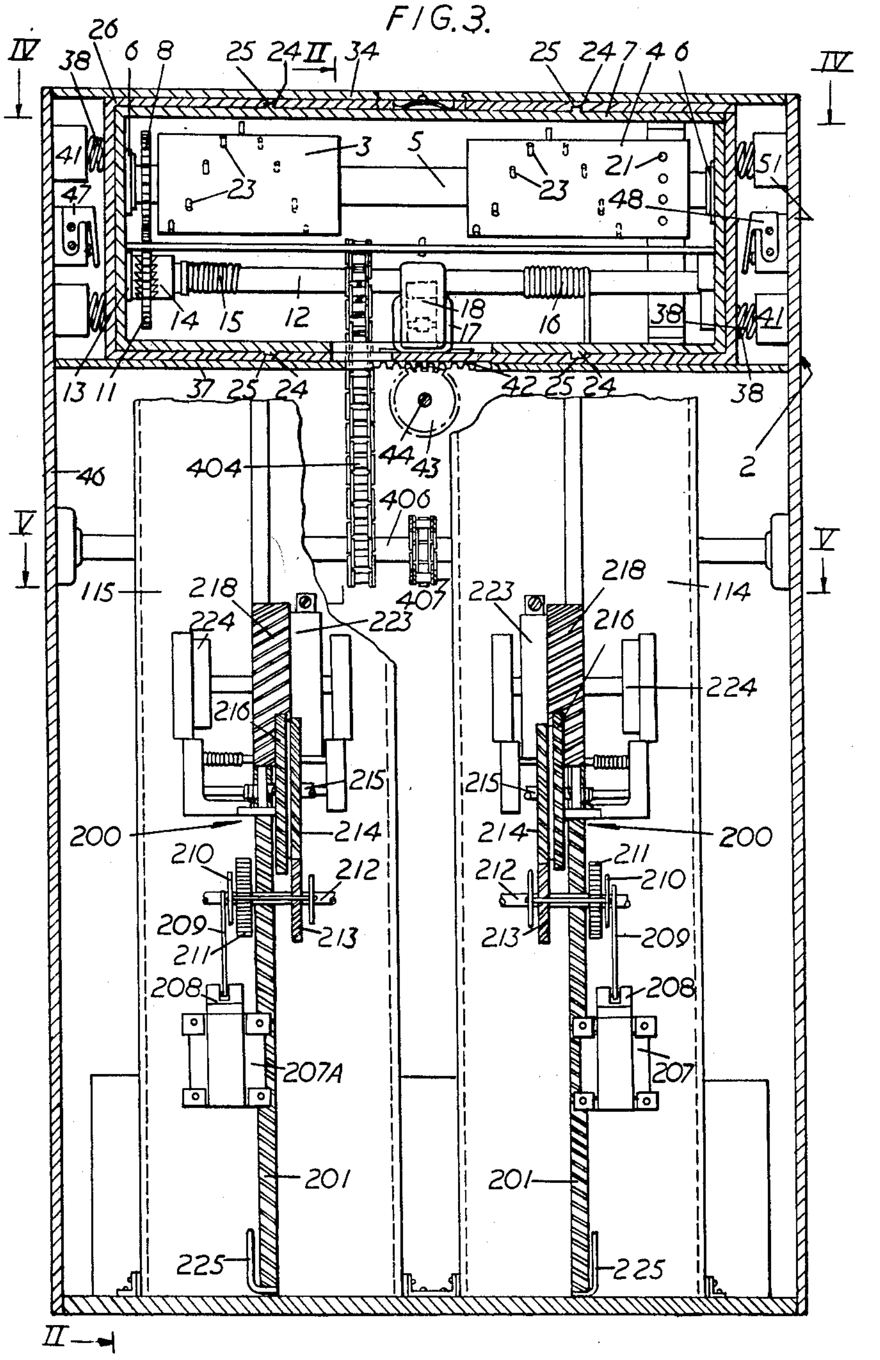
FIG. 3 is a sectional view, partly broken away, along the line III—III of FIG. 2.
Figure 4:
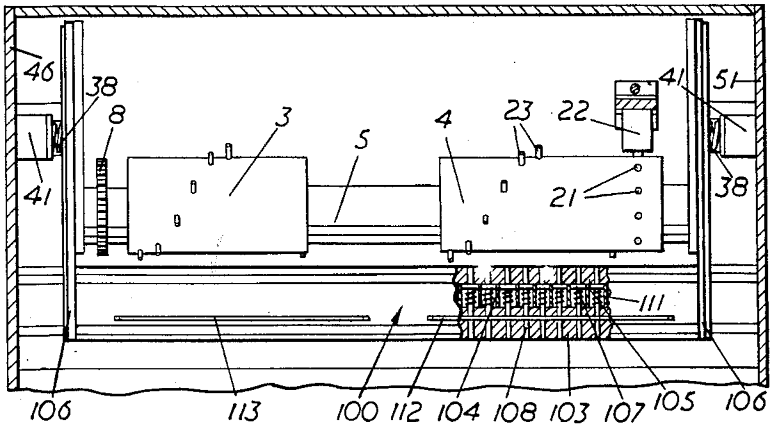
FIG. 4 is a sectional view, partly broken away, along the line IV—IV of FIG. 3.

The device has an assembly of two punch-actuating drums 3 and 4 of which only the drum 4 is visible in FIG. 2, both drums 3 and 4 being visible in FIGS. 3 and 4. At the upper centre of FIG. 2 will be seen a punch and die assembly generally indicated by reference numeral 100. At the centre right hand side of FIG. 2 will be seen one of two record cards displacing arrangements generally indicated by reference numeral 200 (both being visible in FIGS. 3 and 5). At the lower left hand side of FIG. 2 will be seen an electric motor-driven switch assembly generally indicated by reference numeral 300. At the upper right hand side of the figure will be seen a time indicating assembly generally indicated by reference numeral 400.

The assembly comprising the punch-actuating drums 3 and 4, illustrated in greater detail in FIGS. 3 and 4, has a shaft 5 on which the drums 3 and 4 are mounted. The shaft 5 is rotatably mounted in bearings 6 provided on an inner guide box 7, and carries a toothed wheel 8 which is in engagement with a toothed wheel 11 carried on a ratchet shaft 12 extending between bearings 13 on the inner guide box 7.

Toothed wheel 8 is driven in a step-by-step manner, through one-tenth of a revolution per step, by toothed wheel 11, which is intermittently rotated by a ratchet wheel 14 in a manner known per se from step-by-step digital counting mechanisms. Ratchet wheel 14 is spring loaded by a spring 15 and is mounted on the ratchet shaft 12 which is oscillatable against the action of a torsion spring 16 by an electromagnet 17, acting on an armature lever 18 keyed to the shaft 12, the electromagnet 17 being energized once every three minutes by the switch assembly 300. By this means, the drums 3 and 4 are rotated through one revolution each half hour, in ten intermittent steps.

Drum 4 carries ten equi-spaced radially extending projections 21 which cooperate with a spring loaded indexing block 22 for positively locating the drum 4 in any of its ten stepped positions, and consequently similarly locating the drum 3.

The drums 3 and 4 each carry ten radially extending punch-actuating projections 23 which are angularly spaced apart by 36° and also equally spaced along the length of each drum, so that the projections 23 extend helically around each drum.

The inner guide box 7 is movable towards and away from the punch and die assembly 100, the movement being guided by projections 24 (see FIG. 3) engaging channels 25 formed in an outer guide box 26. Movement of the inner guide box 7 is effected by an electromagnet 27 acting on an armature 28 connected by an operating link 31 to the inner guide box 7 (see FIG. 2).

The outer guide box 26, with the inner guide box 7, is movable in a direction at right angles to the direction of movement of the inner guide box 7 and parallel to the shaft 5 by a small amount, for example one-sixteenth of an inch, the movement being guided by a projection 32 formed on the outer guide box 26 and movable in a channel 33 provided in an upper guide plate 34, and by a projection 35 formed on the outer guide box 26 and movable in a channel 36 provided in a lower guide plate 37.

The outer guide box 26 is normally held in a central position between its two extremes of movement by means of compression springs 38 which can be seen in FIG. 3, the springs acting on the ends of the outer guide box 26, distance members 41 being provided between the springs 38 and the casing 2 for giving a positive stop to the movement.

The outer guide box 26 carries a rack 42 with which a toothed wheel 43 meshes. Toothed wheel 43 is mounted on a spindle 44 to which is fixed an operating lever 45, by means of which the outer guide box 26 is thus manually displaceable into either of its two operated positions, depending on the direction in which the operating lever 45 is moved. Between one end of the outer guide box 26 and one side wall 46 of the casing 2, a micro-switch 47 is provided which is connected in parallel with a similar micro-switch 48 positioned between the opposite end of the outer guide box 26 and another side wall 51 of the casing 2. The switch 47 operates to close a circuit for the electromagnet 27 when as a result of operating the lever 45 the outer guide box 26 reaches its extreme left hand position as viewed in FIG. 3, switch 48 operating similarly when the outer guide box 26 reaches its extreme right hand position as viewed in FIG. 3.

The punch and die assembly 100 can be seen in FIGS. 2 and 4. The assembly is flanked by two support guides 101 and 102 between which a die plate 103, a punch housing plate 104, and a punch guide plate 105 of the assembly are positioned. The ends of these plates 103, 104 and 105 are engaged by extensions 106 of the outer guide box 26 so as to be movable with the punch-actuating drums 3 and 4.

Ten punches 107 are provided, one to each of the punch-actuating projections 23 of the drum 4 so that depending on which projection 23 faces the punch and die assembly 100, a particular punch 107 will be operated on actuation of the electromagnet 27. The punches 107 are normally held clear of corresponding die openings 108 in the die plate 103 by springs 111 housed in the punch housing plate 104. A similar set of punches and die openings are provided for cooperating with the punch-actuating projections 23 of the drum 3. A slot 112 allows a record card to be inserted between the die blate 103 and the punch housing plate 104 for punching by the action of the drum 4, and a similar slot 113 allows a record card to be inserted for punching by the action of the drum 3.

Figure 5:
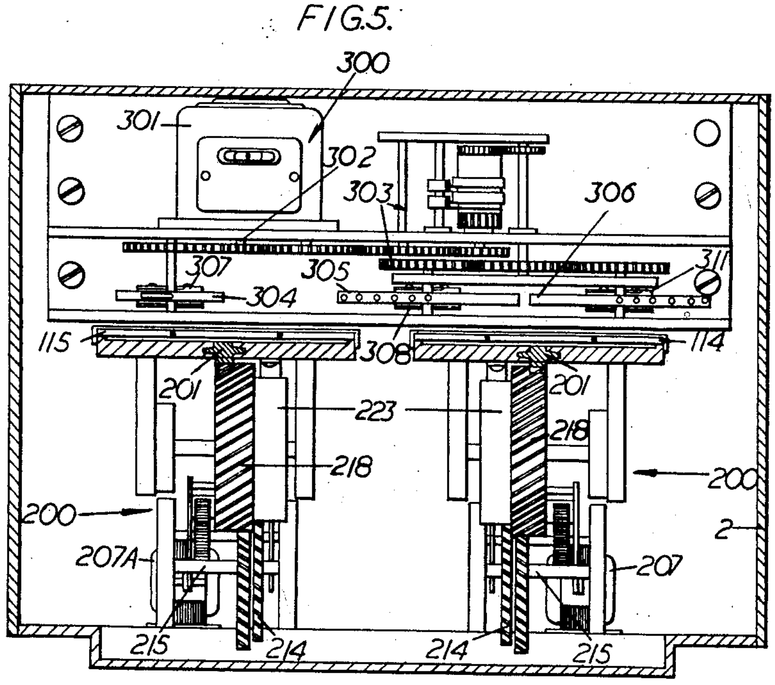
FIG. 5 is a sectional view along the line V—V of FIG. 3.

For receiving a record card introduced into the slot 112 and for receiving a record card introduced into the slot 113, card guides 114 and 115 secured to the casing 2 are provided (see FIG. 5). Since both of the record card displacing arrangements 200 are substantially identical to each other, only one, associated with card guide 114 will be described.

Figure 6:
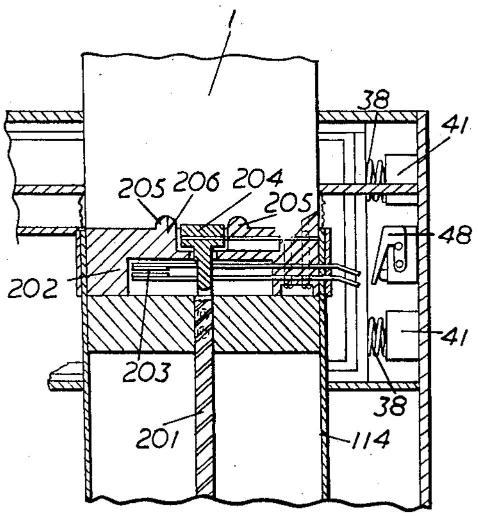
FIG. 6 is a sectional view, partly broken away, showing a record card sensing arrangement of the device.

The point to which a bottom edge of a record card can extend into the card guide 114 is determined by a rack 201 (see FIGS. 2, 3, 5 and 6) forming part of the record card displacing arrangement 200, the rack carrying a card support 202 (see FIG. 6). The card support 202 carries a contact switch 203 which is closed by a switch member 204 operated by the weight of the record card 1, any card other than a correct card for the particular card guide (114) being prevented from reaching the switch member 204 by two blocking projections 205 which however would extend into recesses 206 provided in correct cards. The contact switch 203 is connected in series with an electric circuit for the electromagnet 27.

The card displacing arrangement 200 comprises an electromagnet 207 which is operated for a short time once every half hour for a total single period of twelve hours in each twenty four hours. An armature 208 of the electromagnet 207 is linked by an operating link 209 to a ratchet kicker mechanism 210 associated with a ratchet wheel 211 so that on each operation of the electromagnet 207 the ratchet wheel 211 is turned by one step. The ratchet wheel is mounted on a spindle 212 (see FIG. 3) on which also a toothed wheel 213 is secured. Toothed wheel 213 is in constant mesh with a toothed wheel 214 mounted on a spindle 215. Also mounted on the spindle 215 is a special toothed wheel 216 which is mutilated by removal of teeth at the region 217. Toothed wheel 216 meshes with a toothed wheel 218 engaging the ratchet 201, so that operation of the electromagnet 207 causes the rack 201 to be lowered by one step every half hour, a pawl 221 being provided for preventing the rack from returning until the pawl 221 is tripped.

It is necessary to return the rack 201 once every eighty four hours, that is to say after every seven working shifts of twelve hours each (corresponding to seven actual working shifts of the shift type which corresponds to the movement of the rack 201), by tripping the pawl 221. This is effected by a pin 222 fitted to a side face of toothed wheel 216 in a predetermined position relative to the mutilation 217, the mutilation 217 freeing the tooth wheel 218 at the instant of tripping of the pawl 221, allowing return of the rack 201 by a torsion spring arrangement 223. A damper mechanism 224 is associated with the torsion spring arrangement 223 for governing the speed of return.

The pawl 221 is reengaged with the rack 201 by a pawl return arm 225 fitted to the end of the rack 201 so as to engage the pawl 221 when the rack 201 is in its initial position. The electromagnet corresponding to electromagnet 207 and associated with the other card guide 115 is indicated by reference numeral 207A.

The motor-driven switch assembly 300 (see FIGS. 2 and 5) comprises an electric motor 301 geared for rotation at one revolution per minute at its output shaft 302. By a gear arrangement generally indicated by reference numeral 303, three cam wheels 304, 305 and 306 are rotated. A micro-switch 307 is associated with cam wheel 304, a micro-switch 308 is associated with cam wheel 305 and a micro-switch 311 with cam wheel 306, the gear arrangement 303 and the cam wheels 304, 305 and 306 being so arranged that micro-switch 307 is closed for a short time every three minutes, micro-switch 308 is closed for a short time every half hour over a total single period of twelve hours in each twenty four hours and micro-switch 311 is closed for a short time every half hour over the remaining twelve hour period in each twenty four hours.

As will be seen from the electric circuit diagram of

Figure 7:
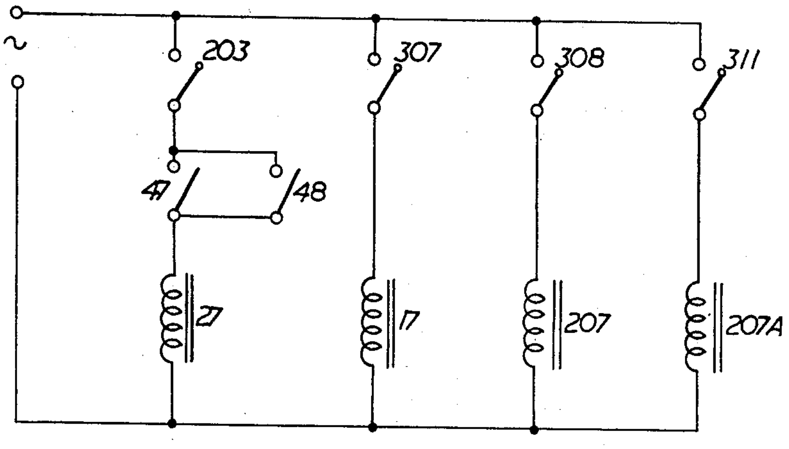
FIG. 7 is an electric circuit diagram of the device.
Figure 19:
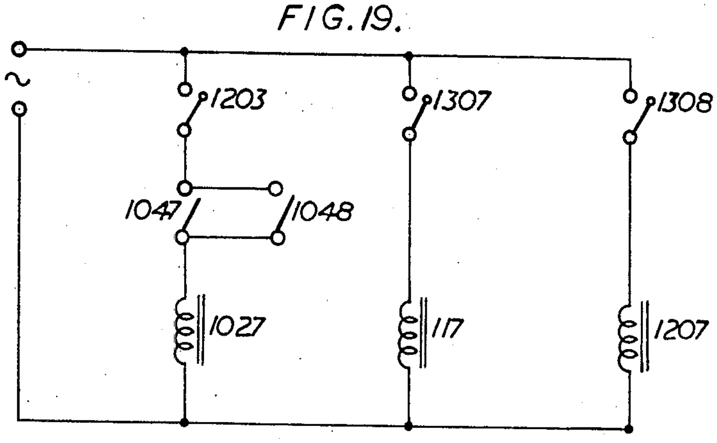
FIG. 19 is an electric circuit diagram of the device of FIGS. 8 to 18.
Figure 8:
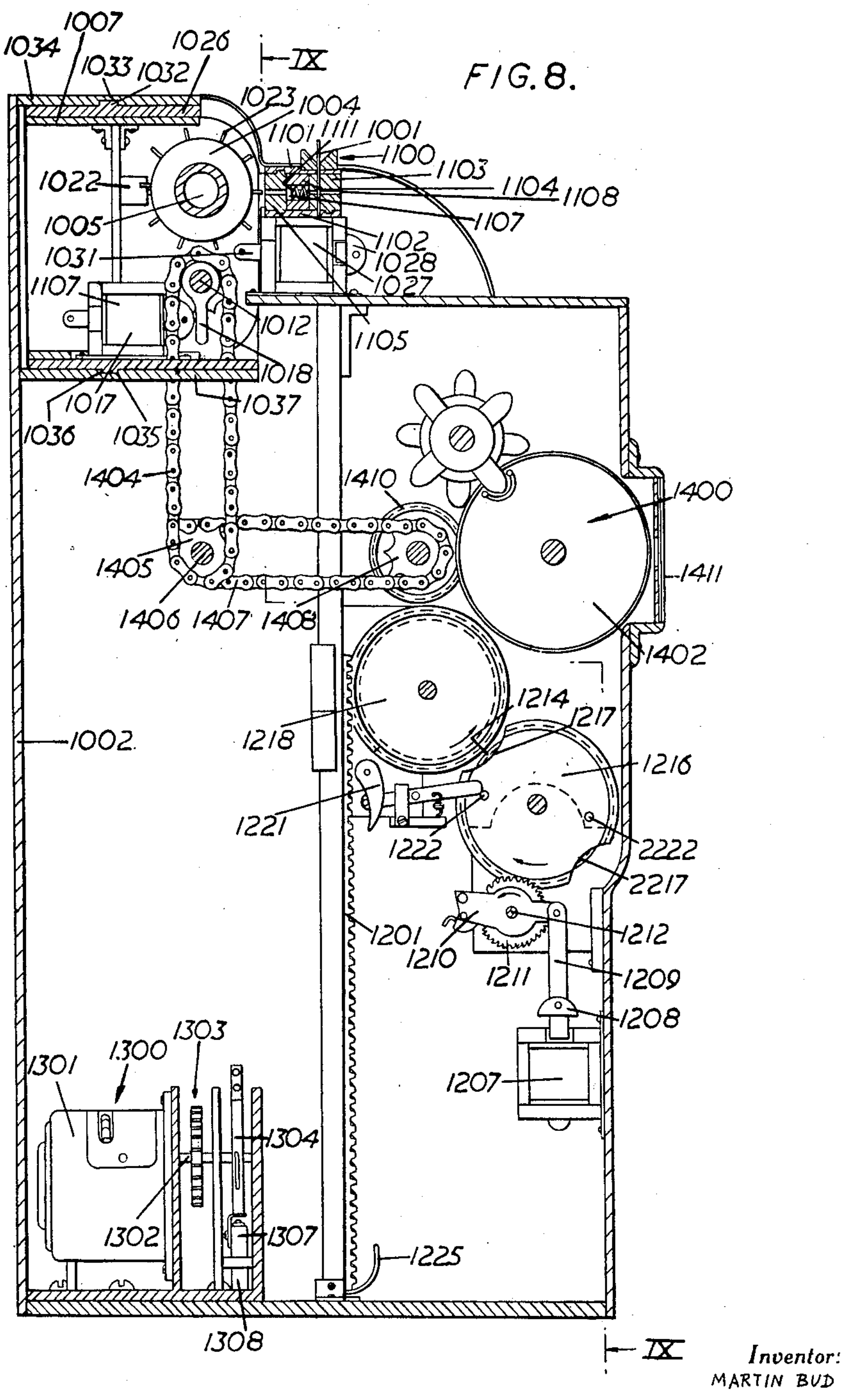
FIG. 8 is a sectional view, partly broken away, and corresponding to FIG. 2, of another time recording device, taken along the line VIII—VIII of FIG. 9.
Figure 9:
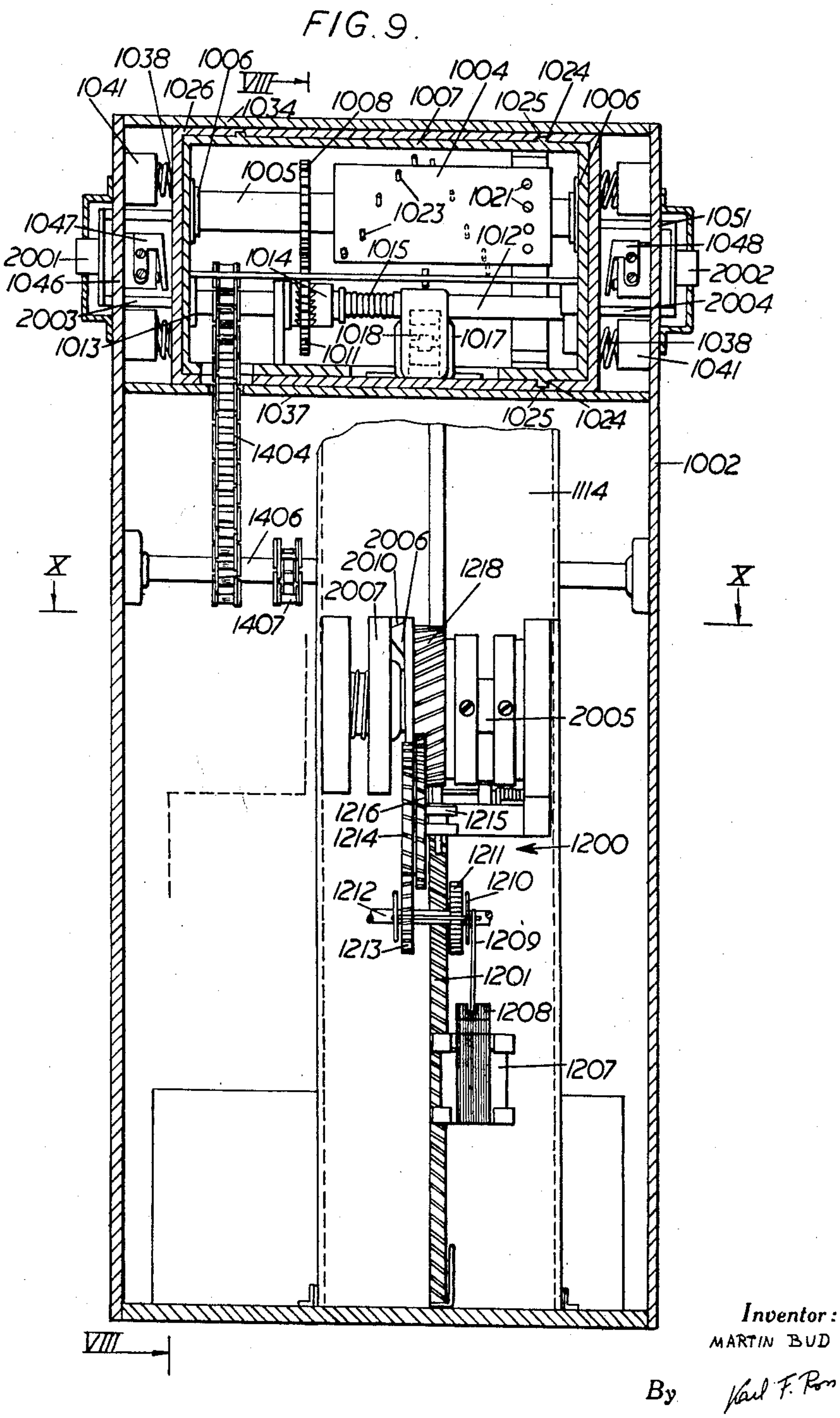
FIG. 9 is a sectional view, partly broken away, along the line IX—IX of FIG. 8.
Figure 10:
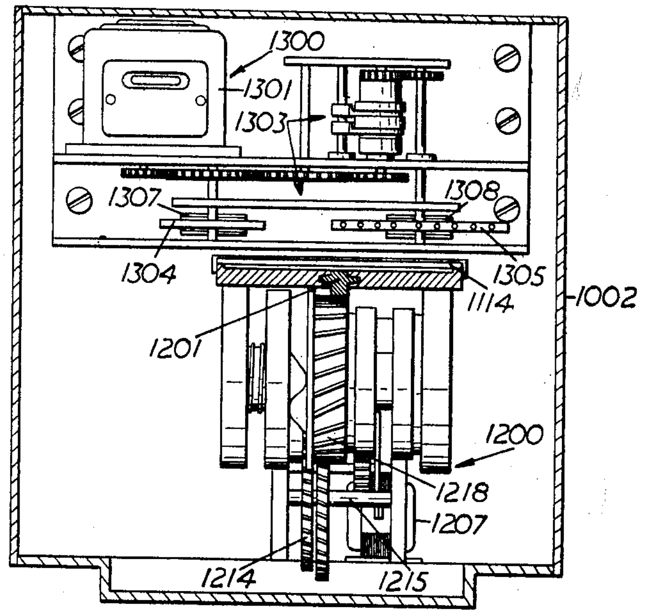
FIG. 10 is a sectional view, along the line X—X of FIG. 9.
Figure 11:
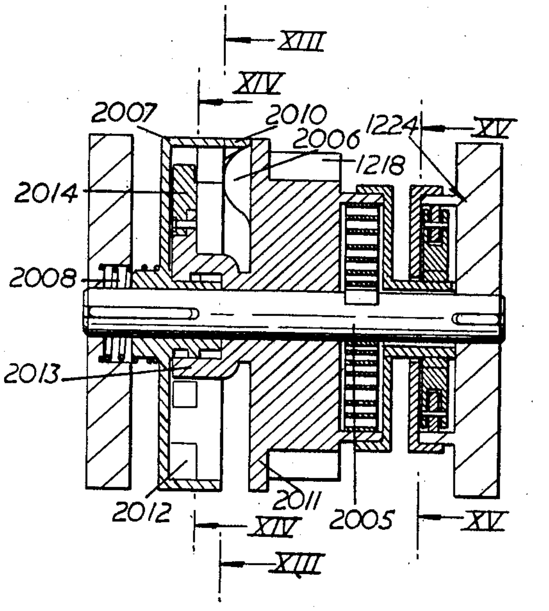
FIG. 11 is a sectional view of a detail of the device of FIGS. 8 to 10 to a larger scale than FIGS. 8 to 10.
Figure 12:
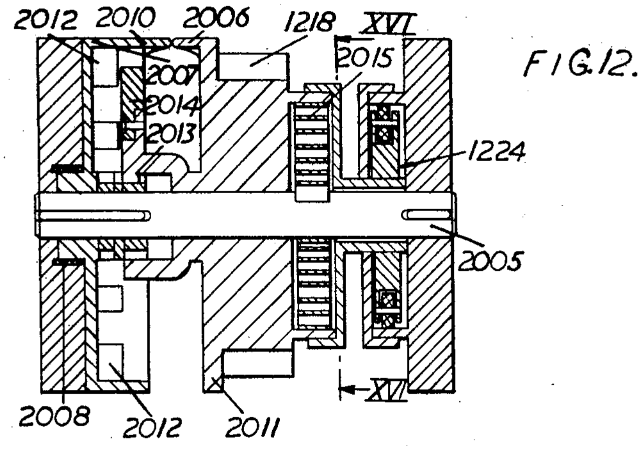
FIG. 12 is a sectional view similar to FIG. 11 but showing components of the figure in different operative positions.
Figure 13:
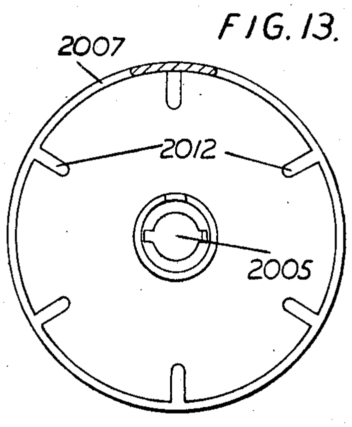
FIG. 13 is a sectional view along the line XIII—XIII of FIG. 11.
Figure 14:
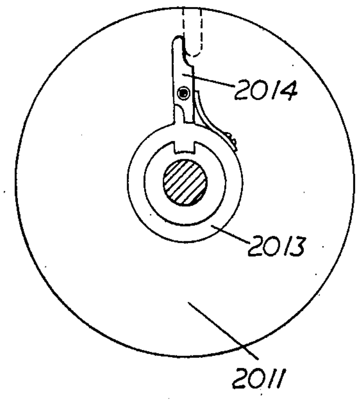
FIG. 14 is a sectional view, partly broken away, along the line XIV—XIV of FIG. 11.
Figure 15:
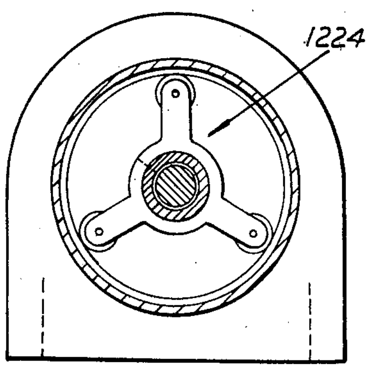
FIG. 15 is a sectional view along the line XV—XV of FIG. 11.
Figure 16:
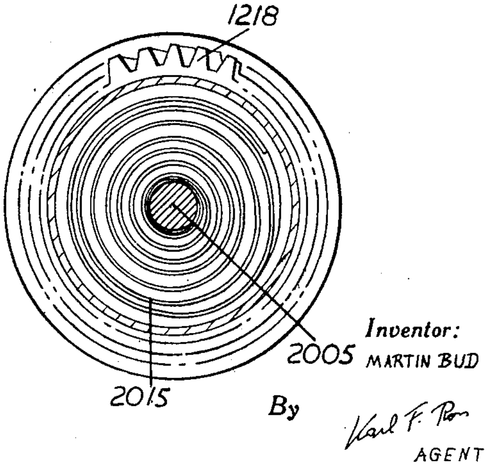
FIG. 16 is a sectional view along the line XVI—XVI of FIG. 12.

FIG. 7, micro-switch 307 controls energization of the electromagnet 17, and consequently stepping of the drums 3 and 4 every three minutes, while micro-switches 308 and 311 respectively control energization of the electromagnet 207 associated with card guide 114 and electromagnet 207A associated with card guide 115 so that the two card guides are alternately available each for a twelve hour period out of twenty four hours.

The time indicating arrangement 400 comprises two indicating wheels 401 and 402 (see FIGS. 1 and 2). Wheel 401 is marked 3, 6 to 60 for indicating minutes in steps of three minutes each. Wheel 401 is driven in a step-by-step manner by three sixtieth of a revolution per step by a chain drive arrangement from the ratchet shaft 12 (see also FIG. 3), the chain drive arrangement comprising a sprocket wheel 403 keyed to the ratchet shaft 12, a chain 404, an intermediate sprocket wheel pair 405 mounted on an intermediate shaft 406, a chain 407, and a sprocket wheel 408 operatively connected to wheel 401. Wheel 401 drives wheel 402 by a 20 to 1 reduction transfer effected by a pinion 410 in a manner known per se from step-by-step digital counting mechanisms. The markings on the wheels 401 and 402 are visible from the front of the device through a window 411 (FIG. 1).

The operation of the device is as follows:

Operation of the switch assembly 300 causes electromagnet 17 to be pulsed once each three minutes, punch-actuating drums 3 and 4 making one step for each pulse. Due to their coupling to the ratchet shaft 12, the time indicating wheels 401 and 402 indicate the time in directly readable form.

Operation of the switch assembly 300 also causes electromagnets 207 and 207A to be pulsed every half hour for twelve hours each, electromagnet 207 covering the first twelve hours of a twenty four hour period and electromagnet 207A covering the other twelve hours. Thus card guide 114 is lowered by one step every half hour for twelve hours while card guide 115 is at rest for twelve hours, and then card guide 115 is lowered by one step every half hour for twelve hours while card guide 114 is at rest for twelve hours. Card guide 114 is thus usable for cards corresponding to one type of shift (in this embodiment night shift) while card guide 115 is usable for day shift cards. When either card guide has been lowered as far as possible, the respective pawl return arm 225 ensures the return of the respective card guide to its initial position by tripping the respective pawl 221.

If, for example, a card is inserted into card guide 114 through slot 112, and if recesses 206 (see FIG. 6) in the card identify it as a night shift card, then it is not obstructed by the blocking projections 205, and causes the switch 203 to close. If then the operating lever 45 is moved either to the right or left, depending whether a clocking-off or clocking-on punching is desired, the outer guide box 26, together with the inner guide box 7, is moved towards micro-switch 48 on the one hand, or towards micro-switch 47 on the other hand. In either case a circuit for electromagnet 27 is then completed, with the result that the electromagnet 27 draws the inner guide box 7 in such a direction that that projection 23 of the drum 4 which faces the punch and die assembly 100 enters the corresponding aperture in the punch guide plate 105, thus forcing the corresponding punch 107 to penetrate the card in cooperation with the corresponding die opening 108 thereby punching the card in a position indicative of the time of punching. Movement of the outer guide box 26, prior to movement of the inner guide box 7, has however caused the punch-actuating drums 3 and 4 and the punch and die assembly 100 to be shifted by a small amount in one direction or the other from an inoperative basic position. A hole punched in a record card, by the direction of its displacement from the basic position, thus indicates whether the punching is for clocking-on or clocking-off, in addition to indicating the time of punching by its general position.

Modifications of this embodiment are possible. For example, the drums 3 and 4 may each have twelve punch-actuating projections 23 and drum 4 twelve projections 21. In this case instead of two sets of ten punches 107 and corresponding die openings 108, two sets of twelve are provided. The switch assembly 300 is then so arranged that the electromagnet 17 is pulsed once every five minutes and electromagnets 207 and 207A pulsed hourly instead of half hourly, so that one column of a card represents one hour instead of half an hour. Appropriate modifications should of course be made to the drive to the time indicating assembly 400.

In another embodiment of the device, as illustrated in FIGS. 8 to 19, provision is made for the insertion of only one type of record card, punchings indicative of day-shift punching times and punchings indicative of night-shift punching times being made on the same card. Consequently, only a single card guide, punch-actuating drum and record card displacing arrangement are required, which are essentially the same as one of the two corresponding components provided in the embodiment of FIGS. 1 to 7.

In view of the similarity between the device of the embodiment of FIGS. 8 to 19 and the device of embodiment of FIGS. 1 to 7 the device of the embodiment of FIGS. 8 to 19 wil be described only insofar as it differs from one half of the device of the embodiment of FIGS. 1 to 7. In FIGS. 8 to 19, components which are similar to corresponding components of FIGS. 1 to 7 have been given the same reference numerals but prefixed by 1, 10, or 100 so that in all cases the reference numerals of FIGS. 1 to 7 are converted into a four figure reference numeral of the order 1000 for FIGS. 8 to 19. Components of FIGS. 8 to 19 which have no counterpart in FIGS. 1 to 7 have been given reference numerals of the order 2000.

It will be noted that the outer guide box 1026 is displaced, not by a toothed wheel and rack, but by means of push buttons 2001 and 2002 mounted respectively on the casing side walls 1046 and 1051, the push buttons 2001 and 2002 being coupled by transfer members 2003 and 2004 respectively to end faces of the outer guide box 1026. Push button 2001 is pressed for clocking-on, and push button 2002 pressed for clocking-off.

Twelve punch-actuating projections 1023 are provided, so that each column of the record card 1001 represents one hour, electromagnet 1017 being pulsed once every five minutes, the card support 1202 being lowered by one step every hour.

In order that no unusable areas will be present on a day shift record card as a result of intervening night-shift periods of operation of the machine, and similarly no such areas on a night-shift record card as a result of intervening day-shift periods of operation of the machine, the record card displacing arrangement 1200 is arranged for lowering the card support 1202 by twenty four steps over a twenty four hour period, then quickly returning the card support 1202 by a distance equal to twelve steps, whereby the information recorded on either a day-shift record card or a night-shift record card will be continuous.

The sequences of lowering the card support 1202 by twenty four steps and returning it through twelve steps are effected by a mechanism associated with toothed wheel 1218 and illustrated in detail in FIGS. 11 to 16. Toothed wheel 1218 is mounted on a shaft 2005 and carries a cam formation 2006. A control drum 2007 slidably but non-rotatably keyed to the shaft 2005 is urged towards the toothed wheel 1218 by a compression spring 2008, a cam formation 2010 normally contacting a flange 2011 of toothed wheel 1218 adjacent the cam formation 2006. Six equally spaced limit stops 2012 (see FIG. 13), integral with the drum 2007 are provided therein. Fitted to a boss 2013 protruding from the flange 2011 is a stop arm 2014 which, when the toothed wheel 1218 is being driven by the toothed wheel 1216, rides over the limit stops 2012. When, however, toothed wheel 1216 is disengaged from toothed wheel 1218 by reason of the mutilation 1217 or another mutilation 2217 then a spiral spring 2015 (FIGS. 12 and 16) rotates the toothed wheel 1218, against its normal direction of rotation as received from toothed wheel 1216, until the stop arm 2014 contacts one of the limit stops 2012. In this way the rack 1201 is lowered by twenty four steps and then raised through a distance equal to twelve steps, until twelve working shifts have been worked, at which point it is necessary to return the rack 1201 to its initial position.

Return of the rack 1201 is effected by the action of the cam formations 2006 and 2010. When the toothed wheel 1218 has made one complete revolution the cam formation 2006, by acting on the cam formation 2010, causes the drum 2007 to be pushed against the action of spring 2008 to such an extent that the limit stops 2012 are moved clear of the stop arm 2014 whereupon the toothed wheel 1218 is quickly rotated through one revolution by the spring 2015. Spring 2008 then returns the drum 2007 so that a limit stop 2012 engages the stop arm 2014 and further rotation is prevented.

To prevent a card being punched for the wrong working shift, for example to prevent a day shift card being punched with a punching indicative of a night shift time, the card support 1202, instead of being provided with two fixed blocking projections, is provided with one fixed blocking projection 1205 and one adjustable blocking projection 2205 for entering respective recesses 1206 and 2206 provided in the card.

Figure 17:
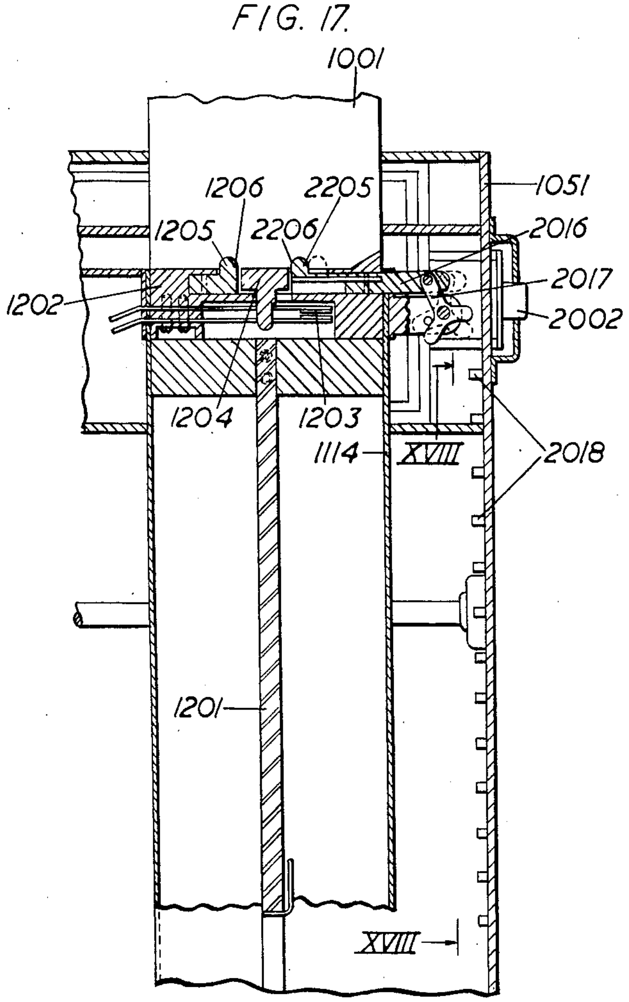
FIG. 17 is a sectional view, partly broken away, showing a record card sensing arrangement of the device of FIGS. 8 to 16.
Figure 18:
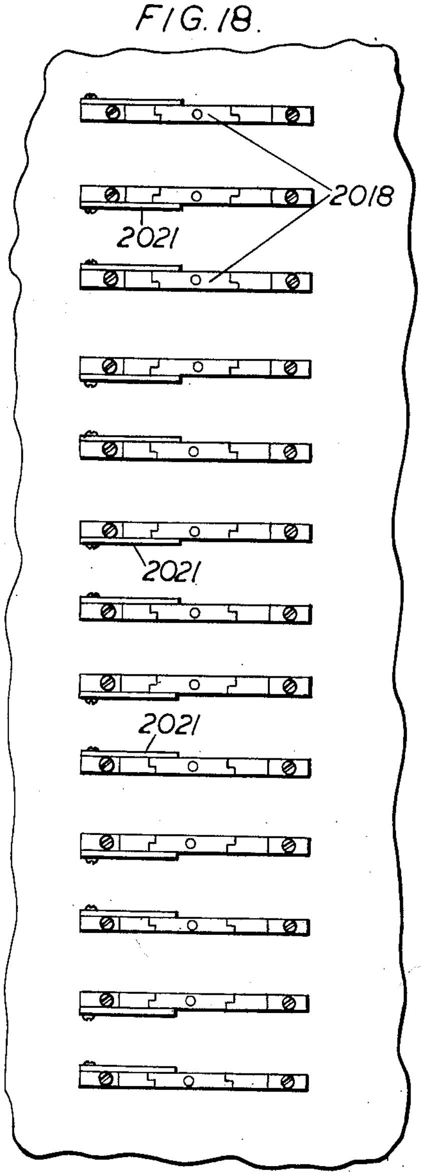
FIG. 18 is a sectional view, partly broken away, along the line XVIII—XVIII of FIG. 17.

Night-shift cards have recess 2206 positioned as shown in full lines in FIG. 17, whereas day-shift cards have recess 2206 positioned as shown in broken lines.

A mechanical arrangement is provided for changing the position of blocking projection 2205 in accordance with the shift being worked, the arrangement being operated when the rack 1201 is moved up and down at each shift change. Blocking projection 2205 is provided on a slide 2016 coupled to a lever 2017 which is tripped into one or the other of two positions by a plurality of gates 2018 (see FIGS. 17 and 18). The gates 2018 have return springs 2021 and are so arranged that alternate gates open in alternate directions but do not open in the reverse direction. In this way the lever 2017 will pass through one gate 2018 without being tripped but will be tripped by a next gate 2018, the function of the gates 2018 reversing on reverse movement of the rack 1201.

While I have described and illustrated two specific embodiments of my invention, it should be clearly understood that the embodiments are described and illustrated only by way of example and that many modifications, additions and omissions are possible without departing from the spirit of my invention.

I claim:

1. In and for a time-recording device the combination comprising a single guide means for positioning a record-receiving means therein, a plurality of blocking means associated with said guide means, means for displacing at least one of said blocking means relative to the other blocking means, said blocking means being arranged for co-operation with complementary means of record receiving means of a first kind, when said blocking means are in a first predetermined relative position and for co-operation with complementary means of record receiving means of a second kind when said blocking means are in a second predetermined relative position, whereby to discriminate between said two kinds of record receiving means, and means for allowing operation of the time recording device only if a record-receiving means of that kind has been positioned in the guide means which corresponds to the relative position into which the blocking means have been displaced.

2. The combination defined in claim 1, wherein the allowing means comprise an electric switch positioned for actuation by a record receiving means only if the complementary means thereof co-operate with said blocking means, an electric circuit, and connections from said switch to said electric circuit so as to allow operation of the time recording device only if said switch has been operated.

3. The combination defined in claim 1, and further comprising a guide means for positioning a record-receiving means therein, a clock mechanism, and a linkage between said guide means and said clock mechanism for displacing said guide means in dependence on the efflux of time, said linkage comprising a first toothed wheel having a mutilation, means for intermittently rotating said first toothed wheel, a second toothed wheel arranged for being driven by said first toothed wheel, a rack rigid with said guide means and meshing with said second toothed wheel, spring means for rotating said second toothed wheel in a sense opposite to its normal sense of rotation whenever the mutilation frees said second toothed wheel from engagement with said first toothed wheel, and stop means for limiting rotation of said second toothed wheel so as to return said single guide means to an intermediate position at sub-intervals of time.

4. The combination defined in claim 1, and further comprising a guide means for positioning a record-receiving means therein, a clock mechanism, and a linkage between said guide means and said clock mechanism for displacing said guide means in dependence on the efflux of time, said linkage comprising a first toothed wheel having a mutilation, means for intermittently rotating said first toothed wheel, a second toothed wheel arranged for being driven by said first toothed wheel, a rack rigid with said guide means and meshing with said second toothed wheel, spring means for rotating said second toothed wheel in a sense opposite to its normal sense of rotation whenever the mutilation frees said second toothed wheel from engagement with said first toothed wheel, and means for automatically returning the guide means to an intermediate position at sub-intervals of time.

References Cited in the file of this patent

UNITED STATES PATENTS

| | | |
|---|---|---|
| 671,129 | Bundy | Apr. 2, 1901 |
| 726,546 | Larrabee | Apr. 28, 1903 |
| 771,494 | Peterson et al. | Oct. 4, 1904 |
| 780,012 | Palmer | Jan. 10, 1905 |
| 1,206,089 | Bryce | Nov. 28, 1916 |
| 2,286,902 | Deane et al. | June 16, 1942 |
| 3,039,103 | Bud | June 12, 1962 |